Feb. 10, 1931.  H. A. MILLER  1,791,737
FLEXIBLE SEALING RING FOR THE MANUFACTURE OF PNEUMATIC TIRE CASINGS
Filed May 4, 1928
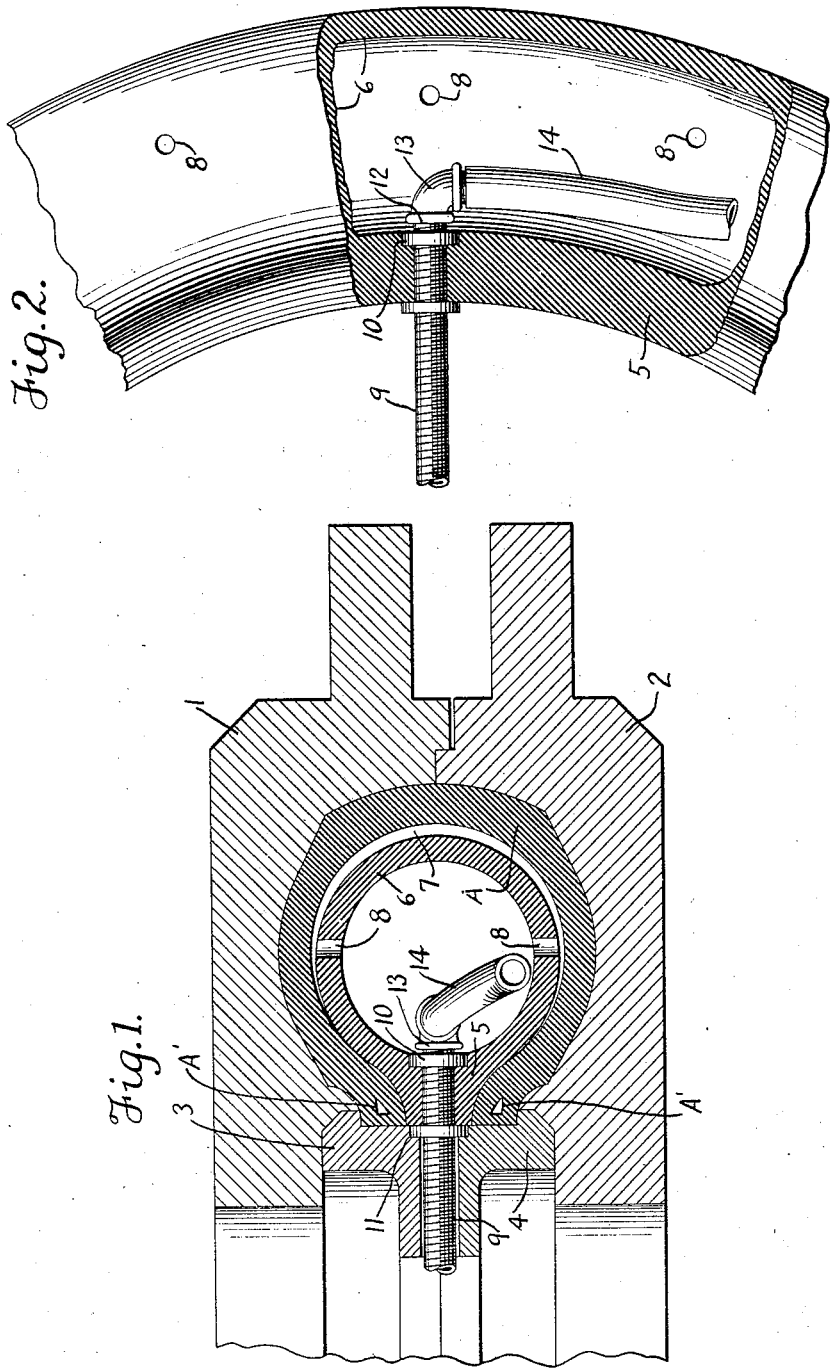

Patented Feb. 10, 1931

1,791,737

UNITED STATES PATENT OFFICE

HARRY A. MILLER, OF AKRON, OHIO, ASSIGNOR TO SEIBERLING RUBBER COMPANY, A CORPORATION OF DELAWARE

FLEXIBLE SEALING RING FOR THE MANUFACTURE OF PNEUMATIC TIRE CASINGS

Application filed May 4, 1928. Serial No. 275,040.

This invention relates to the manufacture of pneumatic tires or tire casings and, while capable of more general application, it is especially adapted for use in connection with a process which contemplates the vulcanization of the casings in molds under the internal pressure of water or an equivalent liquid forced into the casings while sealed.

In carrying out such process it has been proposed to seal the interior of the green or unvulcanized casing by means of a reenforced rubber sealing ring which is made of a size and shape to fill only the space between the beads, leaving the rest of the tire cavity vacant and to be filled by the water admitted through the ring. In the use of such a sealing ring, there is danger of the tire casing collapsing in the mold when the internal pressure is relieved by the drainage of the water from the sealed casing, and while this would be true in any case, it is particularly true when the casing is vulcanized in a pot heater, wherein the steam, which is under vulcanizing temperature pressure, may enter between the mold sections and act directly upon the outside of the casing to force it inwardly. Moreover, when the tire casing is built up in flat or pulley-band form and then expanded into tire shape, it is difficult to insert the sealing ring unless the casing be held in such tire shape long enough to acquire a quasi-permanent set. Consequently, it has been the practice to employ an ordinary air bag (cold) which is left in the green casing for a definite period of time to produce the desired set and then removed for the insertion of the sealing ring.

To overcome the above difficulties, it is proposed, according to the present invention, to provide a sealing ring with a flexible supporting form, which is designed to fit within the tire casing and maintain it at all times in the desired tire shape. As a result, in preparing the green casing for vulcanization, the sealing ring, because of the supporting form with which it is provided, may be inserted immediately into the casing and the latter placed at once in the vulcanizing mold, the supporting form acting to maintain the casing in the desired tire shape in the same way as the air bag under the old practice. Subsequently, when the hot water is drawn from the casing, the supporting form will act in a similar way to prevent the collapse of the casing when the internal pressure drops below the external pressure. While the supporting form might be variously constituted, it is preferably made of hollow tubular form with perforations to establish communication between its interior and the interior of the sealed casing, thus enabling the water to be admitted into the casing and drained from it just as if the supporting form were omitted.

In the embodiment illustrated, the sealing ring and its supporting form are made of rubber and vulcanized together as a homogeneous whole. The supporting form conforms to the shape of the interior of the tire casing (like the ordinary air bag) but is somewhat smaller so as to leave a crescent-shaped space between the form and the inner surface of the tire casing into which the hot water may flow for direct contact with the casing when admitted into the same. Being hollow and perforated, the supporting form will also be filled with hot water, which will thus exert the same pressure both inside and outside and thereby prevent distortion, stretching, or deterioration of the form.

Referring to the drawings:

Fig. 1 is a cross-section of a horizontally disposed mold, such as is employed in a vertical vulcanizer or pot heater, showing a green or unvulcanized tire casing placed in the mold ready to be vulcanized, and illustrating one embodiment of the combined sealing ring and tire supporting form; and Fig. 2 is a sectional elevation, partly broken away, of the combined sealing ring and tire supporting form illustrated in Fig. 1.

The vulcanizing mold herein shown is of standard construction and comprises top and bottom sections 1 and 2 formed with a suitable cavity which determines the final size and shape of the vulcanized casing. The mold is shown as enclosing a green or unvulcanized tire casing A which, it may be observed, is made to fill the mold cavity so that there will be no stretching of the cords when the casing is inflated with water. For nonskid casings, the mold sections will be formed with pockets or depressions to give the particular tread design desired, but these depressions have been omitted from the drawings for the sake of clearness. The casing is mounted, as usual, upon a pair of bead rings 3 and 4 fastened together by bolts or other securing means (not shown) and constituting in effect a curing rim which, when placed in the mold, forms a part thereof and which is formed with seats for the beads $A^1$ of the casing.

The interior of the green or unvulcanized casing is closed by a sealing ring 5 which fits snugly in the space between the beads and serves to clamp them tightly to their seats in the mold when the latter is closed under pressure. In this instance, the sealing ring is provided with a hollow tubular supporting form 6, which is almost but not quite as large as the interior of the tire casing, so as to leave a crescent-shaped space 7 between the form and the inner face of the casing and extending across the latter from one side to the other between points located at or near the bead zones. Both the sealing ring and its supporting form are preferably made of rubber and vulcanized together as a single flexible structure conforming in shape to the ordinary air bag. Incidentally, while other stocks are available, the compounded stock usually employed for air bags may be used in making up the combined sealing ring and supporting form. At its opposite sides, the supporting form 6 is provided with series of perforations 8 to establish communication between its interior and the crescent-shaped space 7. As shown, the sealing ring 5 is also provided with a fluid-conducting pipe 9, which corresponds to the customary valve stem of the ordinary air bag, and which is vulcanized in place in the same way. The pipe extends centrally and radially through the sealing ring and is provided with the usual fixed collar 10 and nut 11 by means of which it is clamped securely and in a fluid-tight manner to the sealing ring. At its outer end (i. e., the end located outside of the mold), the pipe 9 is threaded as usual for connection with the exterior piping. However, and in contradistinction to the ordinary valve stem, the pipe 9 is provided at its inner end (i. e., the end located within the tire supporting form) with a threaded extension 12 fitted with an L-shaped nipple 13 which extends in the direction of the circumference of the ring and lies within the circumferential plane thereof; and there is attached to said nipple a flexible hose section 14 (of rubber or any other suitable material) which rests at its free end upon the bottom side of the tire supporting form at its lowermost point.

The advantages of the above-described combined sealing ring and tire supporting form will now be clear. In preparing the green tire casing for vulcanizing, it is first given the desired shape, which may be done by building it to tire shape upon an iron core or by building it in flat or pulley-band form and then expanding it into the approximate tire shape. After the casing has been thus shaped, the combined sealing ring and supporting form, being flexible and readily deformable, may be easily inserted in the casing and the bead rings 3 and 4 then applied by a rimming press in the usual manner, the supporting form after its insertion in the casing resuming its tire shape and serving during the rimming operation to maintain the casing in the desired tire shape and enabling the sealing ring to be clamped in proper position between the beads. The supporting form will function in like manner when the bead seats are formed directly in the mold sections rather than upon a separate curing rim. After the sealing ring has been clamped in place between the beads, either by the application of the bead rings or by the closing of the mold sections when the latter are formed directly with the bead seats, the tire casing is placed in the mold and is ready for vulcanization. As the hot water is admitted into the sealed casing, it will pass from the flexible hose section 14 into the interior of the supporting form 6 and out through the perforations 8 into the crescent-shaped space 7, before alluded to, for direct contact with the inner surface of the casing, filling both of said spaces and pressing the casing firmly against the mold walls. Due to its tendency to return to pulley-band form, the casing when first placed in the mold may hub the outer periphery of the supporting form 6, but the water in issuing through the perforations 8 will act almost instantly to strip the casing from the form and, in bulging it out against the mold walls, create the crescent-shaped space 7 as intended. Since the pressure of the water will be the same both inside and outside of the supporting form, no distortion or stretching thereof can take place and the action of the water in molding and vulcanizing the tire will be the same as if the supporting form were omitted. When the water is later withdrawn from the casing, it will pass out through the flexible hose section 14 which, being located at the lowermost point within the supporting form, will ensure complete drainage, the water flowing from the crescent-shaped space 7 through the perforations 8 into the interior of the supporting form and thence out through the hose section. When the pressure within the sealed casing is relieved by the drainage of the water therefrom, any tendency of the casing to collapse will be resisted and overcome by the supporting form 6, which possesses sufficient rigidity to subserve this function.

The supporting form 6 thus acts at all times to maintain the tire casing in the proper shape, functioning before vulcanization to hold the green casing in such shape to facilitate the rimming or bead seating operations, and functioning after vulcanization to prevent the vulcanized casing from collapsing within the mold after the drainage of the water therefrom. To perform these functions, it is obvious that the supporting form might take a variety of different shapes or configurations, so long as it is capable of maintaining the casing in tire shape and at the same time provide for the handling of the water and the fluids in the required manner. It hardly needs to be stated that the combined sealing ring and supporting form may be as easily removed from the vulcanized casing as it was inserted in the unvulcanized casing.

Having thus described my invention, what I claim is:

1. A flexible sealing ring adapted to close the space between the beads of a tire casing during vulcanization, and provided with a flexible perforated tire-shaped supporting form, substantially as shown and described.

2. A flexible sealing ring adapted to close the space between the beads of a tire casing during vulcanization, and provided with a flexible hollow perforated tire-shaped supporting form.

3. A flexible sealing ring adapted to close the space between the beads of a tire casing during vulcanization, and provided with a flexible tire-shaped supporting form, the said ring and its supporting form having a fluid-conducting passage extending therethrough to permit the introduction of the curing medium into direct contact with the tire casing.

4. A flexible sealing ring adapted to close the space between the beads of a tire casing during vulcanization, and provided with a flexible hollow perforated tire-shaped supporting form, the said ring having a fluid-conducting pipe extending therethrough and provided within the hollow supporting form with a flexible hose section adapted to rest upon the lowermost portion of the form.

In testimony whereof, I have affixed my signature hereto.

HARRY A. MILLER.